H. GIESECKE.

Horse-Brushes.

No. 8,272. Reissued June 4, 1878.

Attest:
F. H. Schott,
Fred E. Tasker.

Inventor:
Hermann Giesecke
by John C. Tasker & Co.

N. PETERS, PHOTO-LITHOGRAPHER, WASHINGTON, D. C.

UNITED STATES PATENT OFFICE.

HERMANN GIESECKE, OF ST. LOUIS, MISSOURI.

IMPROVEMENT IN HORSE-BRUSHES.

Specification forming part of Letters Patent No. 174,800, dated March 14, 1876; Reissue No. 8,272, dated June 4, 1878; application filed May 9, 1878.

*To all whom it may concern:*

Be it known that I, HERMANN GIESECKE, of St. Louis, in the county of St. Louis and State of Missouri, have invented certain new and useful Improvements in Horse-Brushes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The invention consists in a horse-brush having its tufts of bristles arranged in double rows, those of the double row on the right being directed obliquely to the left, and those of the double row on the left being directed obliquely to the right, so that the tufts of one of these rows shall wholly cross those of the other row, as will be hereinafter more fully described.

Figure 1:
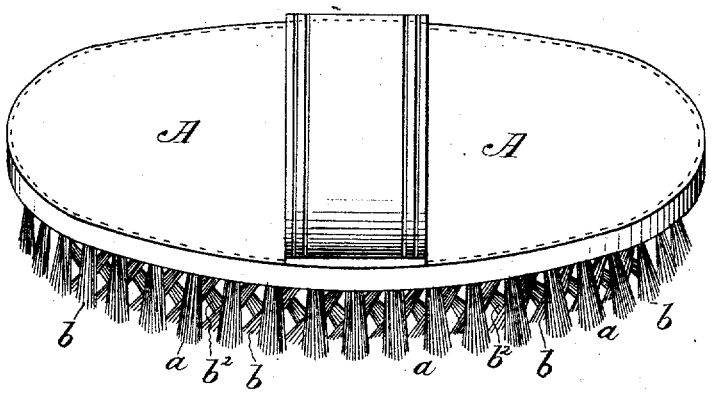
Figure 2:
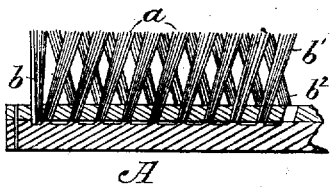

Of the drawing, Figure 1 is a perspective side elevation. Fig. 2 is an enlarged detail section, showing a double row of bristles.

As is well known, the ordinary make of horse-brushes consists in a similarity of rows of tufts of bristles or other suitable material, arranged so as to be in a straight or vertical position in the center of the brush-back, and gradually making each additional row assume a slight inclination outwardly.

In using the brush all the rows of bristles will act in rubbing or brushing in the same direction. More specifically stated, the action of the brush, say in using it in the direction to the right, will cause the bristles to assume in action an inclination to the left; and, vice versa, in directing the brush to the left, all the bristles will assume an inclination to the right. Much strength of action on the part of the brush is thus lost. Further, the bristles can not be made to pass or brush completely through the hair of the animal and reach, as they should, the skin.

In order, therefore, to overcome the said defects in the use of the ordinary brushes, and especially to achieve a better brushing action, so that the user can in less time and with less labor accomplish the desired result, I construct my brush, as will be now fully described, as follows: A represents the brush-back as ordinarily constructed. *a* represents the tufts of bristles or other brush material for the securing of which to the back. I require to drill holes or form seats for the bristles, as well as use wire or other like fastening. *b* represents an outside single row of vertical tufts, positioned and fastened in the brush-back as usual. $b^1$ $b^2$ represent and constitute the double row, as shown. The tufts of bristles $b^1$ of one side of the double row are inclined to the left, and $b^2$, or the other side of the double row, incline to the right—that is, diagonally to each other, so that they wholly cross each other in the center.

The bristles in the rows $b^1$ and $b^2$ are shown as wholly crossing in the middle, and this brings their ends or points in opposite directions to each other, and this arrangement continues throughout, except that the bristles in double rows or alternate double rows may be made to run in any desired direction.

In Fig. 2 (the brush being represented with the points upward) the row $b^2$ inclines to the left, while that of $b^1$ inclines to the right, crossing likewise in the center and presenting oppositely-directed points. In this way I arrange every succeeding double row—viz., so that the diagonal crossing in the middle is had, and the points of the tufts in the double rows, no matter which way they run, point reversely. Every double row of bristles or tufts becomes thus, when used, a brusher and polisher—that is, while one side or part of the double row brushes, the next or other side of the double row smooths over, in whatever direction the brush may be moving. This manner of arrangin gthe tufts of brush material causes one side of the double row to penetrate the hair, as the points are in advance of the butts, while the row, in reverse position, serves to polish what has so been raised by the penetrating tufts.

The inclined forward standing position of the tufts in action adds greater resistance to flexure thereof, and facilitates greatly the brushing action.

What I claim is—

A horse-brush having its tufts of bristles arranged in double rows, those of the row on the right being directed obliquely to the left, and those of the row on the left being directed obliquely to the right, so that the tufts of one row shall stand, as it were, wholly crossing those of the other row, substantially as described and shown.

In testimony that I claim the foregoing I have hereunto set my hand this 8th day of May, 1878.

HERMANN GIESECKE.

Witnesses:
EWELL A. DICK,
JOHN C. TASKER.